US012632470B2

(12) United States Patent
Krishnaswamy

(10) Patent No.: US 12,632,470 B2
(45) Date of Patent: May 19, 2026

(54) SYSTEM AND METHOD FOR TIME-SPATIAL DATA PARTITIONING IN A BLOCKCHAIN NETWORK

(71) Applicant: JIO PLATFORMS LIMITED, Ahmedabad (IN)

(72) Inventor: Dilip Krishnaswamy, Bangalore (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 357 days.

(21) Appl. No.: 18/246,568

(22) PCT Filed: Mar. 28, 2022

(86) PCT No.: PCT/IB2022/052834
§ 371 (c)(1),
(2) Date: Mar. 24, 2023

(87) PCT Pub. No.: WO2022/208312
PCT Pub. Date: Oct. 6, 2022

(65) Prior Publication Data
US 2023/0367790 A1     Nov. 16, 2023

(30) Foreign Application Priority Data
Mar. 31, 2021     (IN) .............................. 202121014973

(51) Int. Cl.
*G06F 16/27* (2019.01)
*G06F 16/22* (2019.01)
*H04L 9/00* (2022.01)

(52) U.S. Cl.
CPC ........ *G06F 16/278* (2019.01); *G06F 16/2246* (2019.01); *G06F 16/2264* (2019.01); *H04L 9/50* (2022.05)

(58) Field of Classification Search
CPC ............... G06F 16/278; G06F 16/2246; G06F 16/2264; H04L 9/50
See application file for complete search history.

(56) References Cited

U.S. PATENT DOCUMENTS 9,356,793 B1 * 5/2016 Drobychev ............. G06F 16/27
2008/0215641 A1 * 9/2008 Mukhi ................... G05B 21/02
(Continued)

OTHER PUBLICATIONS

International Search Report from International Appl. No. PCT/IB2022/052834, mailed Jul. 7, 2022.

*Primary Examiner* — Jensen Hu
(74) *Attorney, Agent, or Firm* — FINNEGAN, HENDERSON, FARABOW, GARRETT DUNNER, LLP

(57) ABSTRACT

The present disclosure generally relates to partitioning of data in a blockchain network, more particularly to system and method for time-spatial data partitioning in blockchain network. The system receives, to record to blockchain network, blockchain data comprising different types of information associated with tasks, and determine time dimensions and spatial dimensions from received blockchain data to analyze metrics or usage patterns at different time windows for pre-defined time. Further, system assigns in blockchain network, hierarchical structure with different levels for time-spatial partitions, based on the determined time dimensions and spatial dimensions. Furthermore, the system aggregates arrival data processing rate of tasks for accomplishing across he assigned time-spatial partitions relative to single time-spatial partition. Thereafter, the system processes data in hierarchical structure of blockchain network across time-spatial partitions, when the processing of the aggregated arrival data is to be performed across the one or more time-spatial partitions.

16 Claims, 12 Drawing Sheets

(56)     References Cited

U.S. PATENT DOCUMENTS

| 2020/0014529 | A1* | 1/2020 | Kanza | G07F 9/001 |
|---|---|---|---|---|
| 2020/0042635 | A1* | 2/2020 | Douglass | G06F 16/278 |
| 2020/0076889 | A1* | 3/2020 | Shankar Iyer | H04L 9/0643 |
| 2020/0252221 | A1* | 8/2020 | Zamani | H04L 63/123 |
| 2021/0056126 | A1 | 2/2021 | Pham et al. | |
| 2021/0352142 | A1* | 11/2021 | Jayaram | G06Q 20/26 |
| 2022/0318648 | A1* | 10/2022 | Safary | H04L 9/0643 |

* cited by examiner

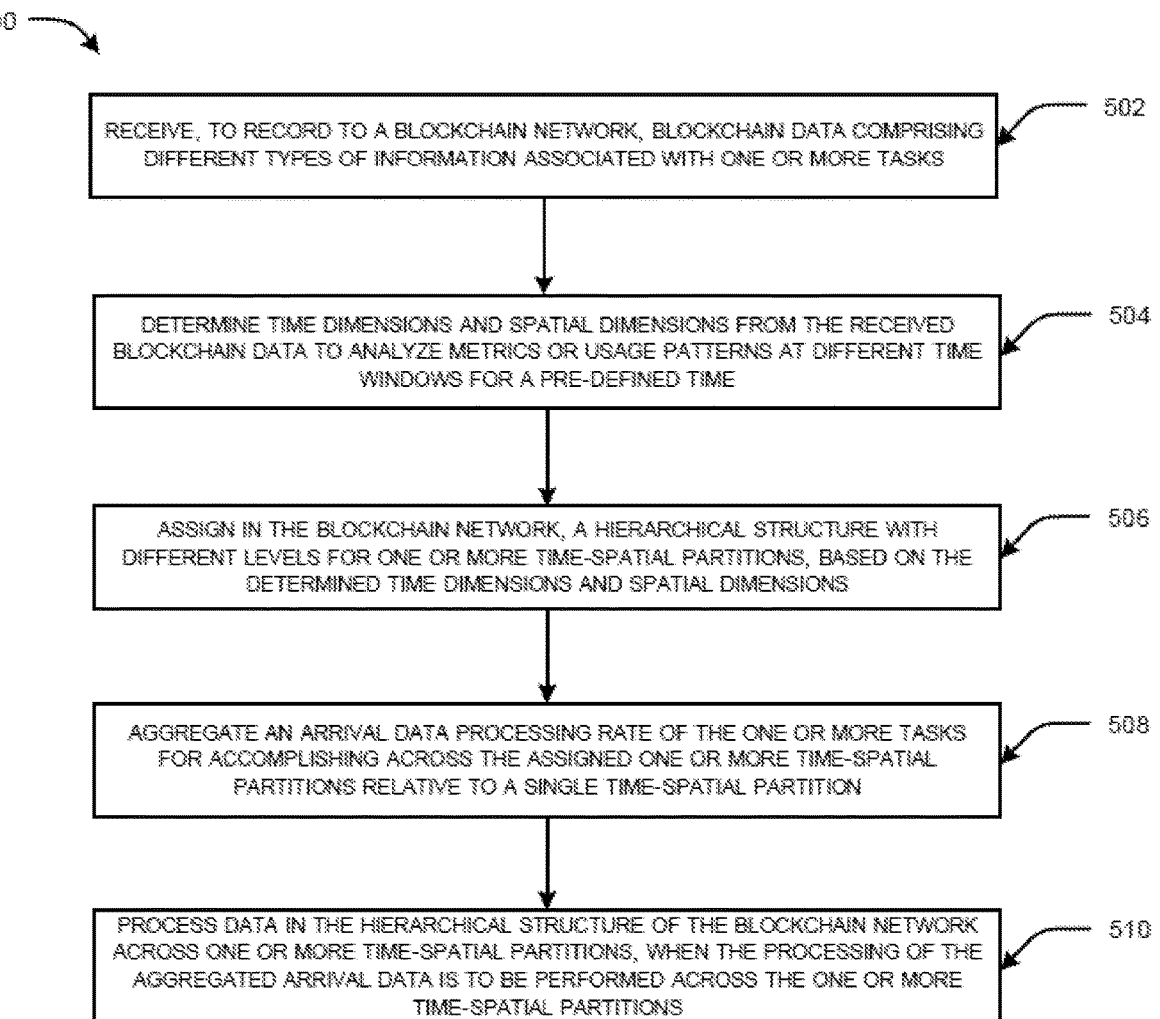

500

502
RECEIVE, TO RECORD TO A BLOCKCHAIN NETWORK, BLOCKCHAIN DATA COMPRISING DIFFERENT TYPES OF INFORMATION ASSOCIATED WITH ONE OR MORE TASKS

504
DETERMINE TIME DIMENSIONS AND SPATIAL DIMENSIONS FROM THE RECEIVED BLOCKCHAIN DATA TO ANALYZE METRICS OR USAGE PATTERNS AT DIFFERENT TIME WINDOWS FOR A PRE-DEFINED TIME

506
ASSIGN IN THE BLOCKCHAIN NETWORK, A HIERARCHICAL STRUCTURE WITH DIFFERENT LEVELS FOR ONE OR MORE TIME-SPATIAL PARTITIONS, BASED ON THE DETERMINED TIME DIMENSIONS AND SPATIAL DIMENSIONS

508
AGGREGATE AN ARRIVAL DATA PROCESSING RATE OF THE ONE OR MORE TASKS FOR ACCOMPLISHING ACROSS THE ASSIGNED ONE OR MORE TIME-SPATIAL PARTITIONS RELATIVE TO A SINGLE TIME-SPATIAL PARTITION

510
PROCESS DATA IN THE HIERARCHICAL STRUCTURE OF THE BLOCKCHAIN NETWORK ACROSS ONE OR MORE TIME-SPATIAL PARTITIONS, WHEN THE PROCESSING OF THE AGGREGATED ARRIVAL DATA IS TO BE PERFORMED ACROSS THE ONE OR MORE TIME-SPATIAL PARTITIONS

FIG. 5

SYSTEM AND METHOD FOR TIME-SPATIAL DATA PARTITIONING IN A BLOCKCHAIN NETWORK

RESERVATION OF RIGHTS

FIELD OF INVENTION

The embodiments of the present disclosure generally relate to partitioning of data in a blockchain network. More particularly, the present disclosure relates to a system and a method for time-spatial data partitioning in a blockchain network.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In general, a blockchain network may be a distributed ledger network which records transactions among one or more participants without a central authority to authenticate the transactions. Enterprises may have multiple private blockchain networks where each network may be dedicated to a specific use case or department or business vertical. In the conventional configuration of the blockchain network, the ledger may be distributed across multiple nodes, with each node maintaining a complete copy. The size of the ledger increases with the increase in the number of transactions at the network, which results in the processing and storing of more data at each node of the blockchain network. In such cases, deployment of additional nodes would exacerbate the problem as the process of verification may need more time. To support a large number of devices and blockchain transactions, the blockchain network may need to be highly scalable, high performance, secure, and support too frequent micro-payments. Further, techniques such as sharding may have been developed in the past to scale the blockchain network. The sharding technique may be a mechanism for spreading out workload processing and data storage in the blockchain network, to reduce the transactional load at each node of the blockchain network. In particular, in the sharding the data may be partitioned into smaller chunks, also referred to as shard, across multiple servers, and after the partitioning, each node is assigned to an individual shard. Hence, each node may need to process only a part of the entire data on the blockchain network, which may enable parallel processing of the data. As a result, the number of transactions can be increased in a particular period. Thus, the sharding can be effective to improve the performance of the blockchain network, while reducing the amount of data to be processed at each node in the blockchain network, thereby scaling the blockchain networks.

However, in the sharding technique, each shard may act as a separate blockchain network instead of a segment of a larger system, which may lead to difficulty in communication between shards, as it requires a special development effort to implement a communication mechanism. Even with such a mechanism, inter-shard communication can lead to greater overhead. Therefore, users and applications of one domain may not able to communicate with users and applications of another domain. Further, the sharding technique may also suffer from security issues, as a single shard can be easily hacked due to the reduced hash power required to control individual segments. With the implementation of the sharding technique, the user may be no longer able to download and validate the entire transaction history, thereby reliability and immutability may be compromised. Another challenge with the blockchain sharding technique may be associated with consensus and verification. Different blockchain approaches rely on different algorithms for reaching consensus across nodes. The impact of such algorithms may also depend on the implementation of the sharding technique. There may be no such standardized technique to implement sharding technique. The aforementioned problem may be reduced by increasing the block size. With the increase in the block size, more transactions can be performed into a block. However, the bigger block size requires more computing power to verify the block. Non-patent literature document titled "Towards Scaling Blockchain Systems via Sharding"—H. Dang, et al, ACM Sigmod 2019, describes techniques to scale blockchain systems via the sharding technique. The document identifies the problems due to fundamental differences in failure models between traditional distributed databases and blockchain systems. To overcome such problems, the cited document proposes a method for enhancing the performance of consensus protocols and designing an efficient shard formation protocol and a general distributed transaction protocol. Furthermore, the cited document proposes an extensive evaluation of the design both on multiple platforms. However, the cited document does not provide an effective solution to overcome the above-mentioned challenges. Further, a non-patent literature document titled "On Sharding Open Blockchains with Smart Contracts"—Y Tao et al, 2020 IEEE 36th International Conference on Data Engineering (ICDE)—describes a new distributed and dynamic sharding system to improve the throughput of blockchain systems substantially based on smart contracts. Particularly, the cited document proposes an inter-shard merging algorithm with incentives to encourage small shards to merge and form a larger shard. However, the cited document does not provide an effective solution to overcome the above-mentioned challenges.

Therefore, there is a need in the art to provide a robust, reliable, and efficient system and method for time-spatial data partitioning in a blockchain network.

OBJECTS OF THE PRESENT DISCLOSURE

Some of the objects of the present disclosure, which at least one embodiment herein satisfies, are as listed herein below.

In a general aspect, the present disclosure provides a system and a method for time-spatial data partitioning in a blockchain network.

In an aspect, the object of the present disclosure is to enable faster processing and concurrent processing across time-spatial partitions.

In another aspect, the object of the present disclosure is to provide a system and a method to be operated under variable data processing rates, which allows dynamic scaling of the blockchain network.

In another aspect, the object of the present disclosure is to support variable task complexity in the blockchain network.

In another aspect, the object of the present disclosure is to allow communication between time-spatial partitions based on the hierarchical structure of the time-spatial partitions.

In another aspect, the object of the present disclosure is to provide performance gain, based on the number of time-spatial partitions and the aggregate arrival rate of concurrent task processing across the time-spatial partitions compared to arrival rate the processing for a single time-spatial partition.

In another aspect, the object of the present disclosure is to provide the time-spatial partitions that are formed in a virtualized stateless microservices-based blockchain network, such that the blockchain nodes can continue to have access to data across time-spatial partitions based on configured access-control permissions in the system.

SUMMARY

This section is provided to introduce certain objects and aspects of the present invention in a simplified form that are further described below in the detailed description. This summary is not intended to identify the key features or the scope of the claimed subject matter.

In an aspect, the present disclosure provides a system for time-spatial data partitioning in a blockchain network. The system receives, to record to a blockchain network, blockchain data comprising different types of information associated with one or more tasks. Further, the system determines time dimensions and spatial dimensions from the received blockchain data to analyze metrics or usage patterns at different time windows for a pre-defined time. Furthermore, the system assigns in the blockchain network, a hierarchical structure with different levels for one or more time-spatial partitions, based on the determined time dimensions and spatial dimensions. Thereafter, the system aggregates an arrival data processing rate of one or more tasks for accomplishing across the assigned one or more time-spatial partitions relative to a single time-spatial partition. Further, the system processes data in the hierarchical structure of the blockchain network across one or more time-spatial partitions, when the processing of the aggregated arrival data is to be performed across the one or more time-spatial partitions.

In another aspect, the present disclosure further provides a method for time-spatial data partitioning in a blockchain network. The method includes receiving, to record to a blockchain network, blockchain data comprising different types of information associated with one or more tasks. Further, the method includes determining time dimensions and spatial dimensions from the received blockchain data to analyze metrics or usage patterns at different time windows for a pre-defined time. Furthermore, the method includes assigning in the blockchain network, a hierarchical structure with different levels for one or more time-spatial partitions, based on the determined time dimensions and spatial dimensions. Thereafter, the method includes aggregating an arrival data processing rate of one or more tasks for accomplishing across the assigned one or more time-spatial partitions relative to a single time-spatial partition. Further, the method includes processing data in the hierarchical structure of the blockchain network across one or more time-spatial partitions, when the processing of the aggregated arrival data is to be performed across the one or more time-spatial partitions.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 5 illustrates an exemplary method flow chart depicting a method for time-spatial data partitioning in a blockchain network, in accordance with an embodiment of the present disclosure.

Figure 1:
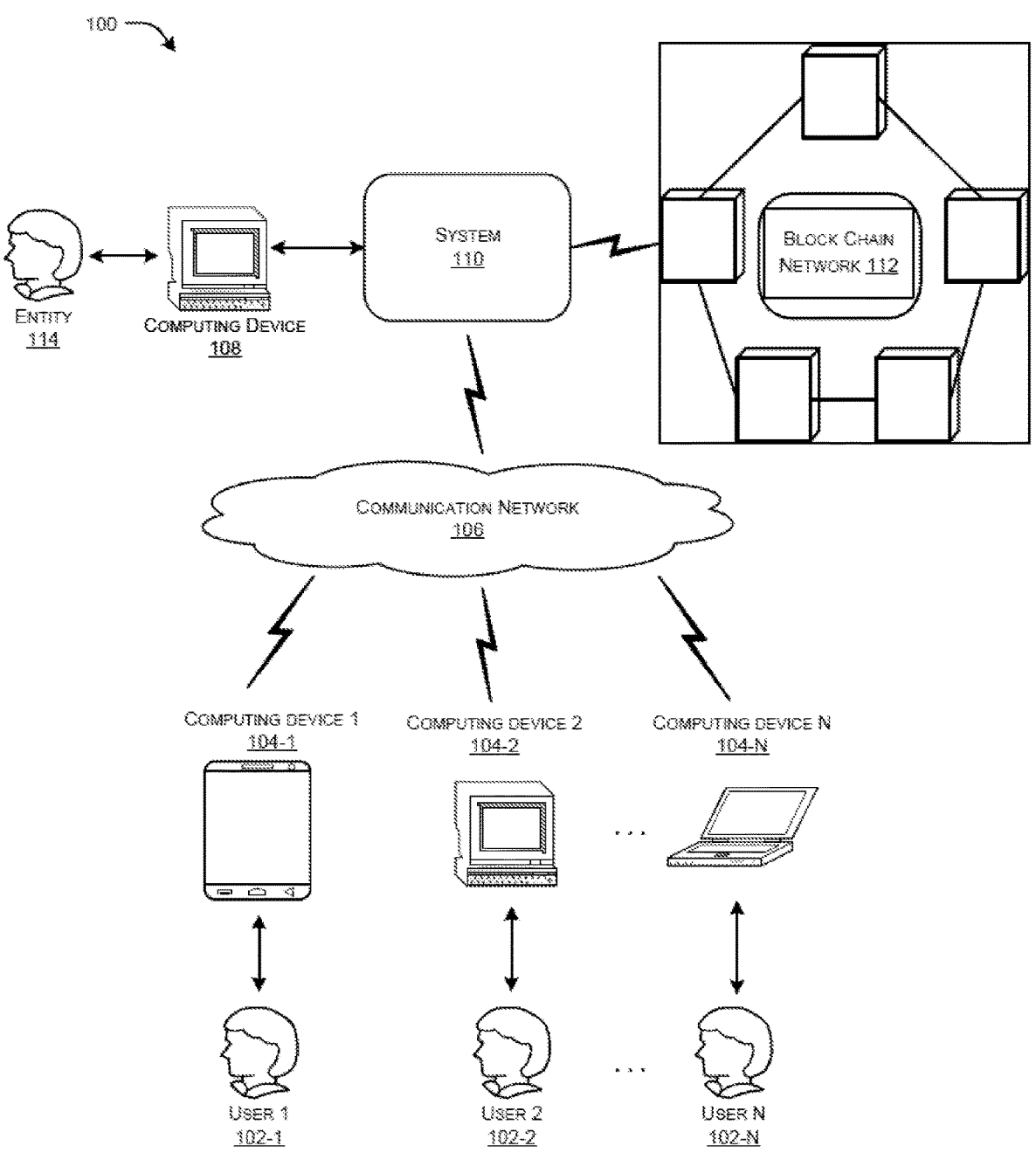
FIG. 1 illustrates an exemplary network architecture in which or with which the system of the present disclosure can be implemented for time-spatial data partitioning in a blockchain network, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art.

Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Various embodiments of the present disclosure provide a system and a method time-spatial data partitioning in a blockchain network. The present disclosure facilitates optimization of blockchain data processing across both time and spatial dimensions, thereby facilitating faster processing and concurrent processing across time-spatial partitions in the blockchain network. In particular, the processing of the data in the blockchain network based on time-spatial partitioning allows blockchain nodes to have access to information across time-spatial partitions. The performance gain through the proposed system and method can be expected based on the number of time-spatial partitions and the aggregate arrival rate of concurrent task processing across the time-spatial partitions compared to arrival rate the processing for a single time-spatial partition.

Embodiments of the present disclosure may be implemented in a distributed ledger network such as a blockchain network in which transactions may be performed between different nodes of the network, where the node may also refer to the entity. The blockchain network implemented as a peer-to-peer network, may enable entities to perform secure and immutable transactions. The time-spatial partitioning allows the blockchain nodes to have access to information across time-spatial partitions. In an embodiment, the time-spatial partitions are formed in a virtualized stateless microservices-based blockchain network, such that the blockchain nodes can continue to have access to data across time-spatial partitions based on configured access-control permissions in the system.

The proposed system and method based on the time-spatial partitioning improves blockchain processing for each specific use-case whenever possible when such time-spatial dimensions can be identified for a use-case, and can be leveraged across different blockchain use-cases as well. The time-spatial dimensions for time-spatial partitioning may vary depending on the use-case considered for data processing in the blockchain network.

Referring to FIG. 1 that illustrates an exemplary network architecture for time-spatial data partitioning system (100) (also referred to as network architecture (100)) in which or with which a system (110) of the present disclosure can be implemented, in accordance with an embodiment of the present disclosure. As illustrated, the exemplary network architecture (100) may be equipped with the system (110) for time-spatial data partitioning in a blockchain network based on blockchain data received from users (102-1, 102-2, . . . 102-N) (individually referred to as the user (102) and collectively referred to as the users (102)) associated with one or more first computing devices (104-1, 104-2 . . . 104-N) (individually referred to as the first computing device (104) and collectively referred to as the first computing devices (104)). The system (110) may be further operatively coupled to a second computing device (108) associated with an entity (114). The entity (114) may include a vendor, a network operator, a company, an organization, a university, a lab facility, a business enterprise, a defense facility, or any other secured facility. In some implementations, the system (110) may also be associated with the second computing device (108). Further, the system (110) may also be communicatively coupled to one or more first computing devices (104) via a communication network (106). The communication network (106) may include a wireless network, a wired network or a combination thereof that can be implemented as one of the different types of networks, such as Intranet, Local Area Network (LAN), Wide Area Network (WAN), Internet, and the like. Further, the communication network (106) may be either be a dedicated network or a shared network. The shared network can represent an association of the different types of networks that can use a variety of protocols, for example, Hypertext Transfer Protocol (HTTP), Transmission Control Protocol/Internet Protocol (TCP/IP), Wireless Application Protocol (WAP), and the like.

In some implementations, the one or more first computing devices (104) and the second computing devices (108) may include, but are not limited to, a handheld wireless communication device (e.g., a mobile phone, a smartphone, a phablet device, and so on), a wearable computer device (e.g., a head-mounted display computer device, a head-mounted camera device, a wristwatch computer device, and so on), a Global Positioning System (GPS) device, a laptop computer, a tablet computer, or another type of portable computer, a media-playing device, a portable gaming system, and/or any other type of computing device with wireless communication capabilities, and the like.

In some implementations, the system (110) may be coupled to a blockchain network (112). While a single blockchain network is shown in FIG. 1, it is understood that multiple blockchain networks may be utilized for the time-spatial data partitioning capabilities described herein. The blockchain network (112) may also be operatively coupled to one or more first computing devices (104) and the second computing devices (108) through the communication network (106). As illustrated in FIG. 1, the blockchain network (112) is an illustrative example in accordance with at least one embodiment of the present disclosure. The blockchain network (112) illustrates a simplified blockchain having blocks. The blocks may include a genesis block. Each block may include certain information, such as identification, or hash, that uniquely identifies the block, a timeline identifying previous blocks (e.g., the hash numbers of previous blocks) in chronological order, transactions to record all transfers between a sender and a receiver, and a public key that identifies at least one sender and at least one receiver.

The linked blocks, therefore, form a chain where each link, or block, in the chain uniquely identifies a previous link, or block, by including the hash or the prior link, or block. The blockchain network (112), may be a distributed ledger, or blockchain may be distributed, or replicated, on a network. The distributed ledger may be replicated and maintained on a database within the underlying blockchain network (112). The blockchain network (112) (or decentralized secure transaction ledger) may be maintained by nodes in a distributed network. Although each block of blockchain network (112)/ledger may include differentiated information and may have distinct purposes, each block may include, but are not limited to, communication, a message, information, data, and the like.

Although FIG. 1 shows exemplary components of the network architecture (100), in other implementations, the network architecture (100) may include fewer components, different components, differently arranged components, or additional functional components than depicted in FIG. 1. Additionally, or one or more components of the network architecture (100) may perform functions described as being performed by one or more other components of the network architecture (100).

In some implementations, the system (110) may be a standalone device and may be communicatively coupled to the computing device (not shown in FIG. 1) and/or a centralized server (not shown in FIG. 1). In another implementation, the system (110) may be associated with the computing device or the centralized server. The system (110) may be implemented in, but are not limited to, an electronic device, a mobile device, a wireless device, a wired device, a server, and the like. Such server may include, but are not limited to, a standalone server, a remote server, a cloud server, a dedicated server, and the like. In an embodiment, the system (110) may communicate with other devices or the one or more first computing devices (104) or the second computing device (108), or the blockchain network (112) using a low point-to-point communication protocol such as Bluetooth®. In other embodiments, the system may also communicate via other various protocols and technologies such as WiFi®, WiMax®, iBeacon®, and near field communication (NFC). In other embodiments, the system (110) may connect in a wired manner to the devices. Examples of the entity devices may include, but are not limited to, computer monitors, television sets, light-emitting diodes (LEDs), and liquid crystal displays (LCDs).

Figure 2:
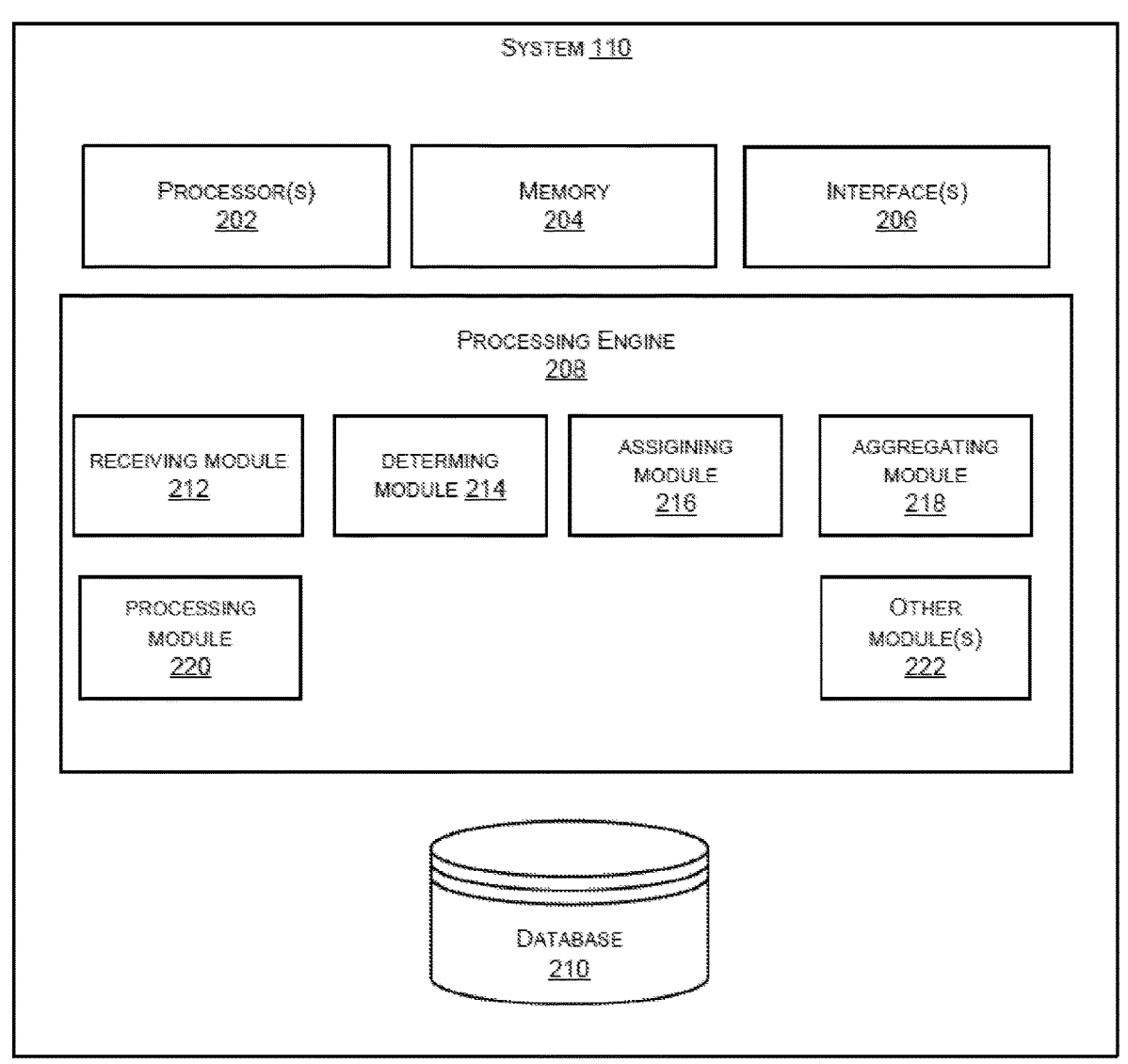
FIG. 2 illustrates an exemplary representation of a system for time-spatial data partitioning in a blockchain network, in accordance with an embodiment of the present disclosure.

In an embodiment, the system (110) may include one or more processors coupled with a memory, wherein the memory may store instructions which when executed by the one or more processors may cause the system (110) to perform determination of congestion in the telecommunication deployment area. An exemplary representation of the system (110) for the determination of congestion in the telecommunication deployment area, in accordance with an embodiment of the present disclosure, is shown in FIG. 2. In an aspect, the system (110) may include one or more processor(s) (202). The one or more processor(s) (202) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer-readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110) may include an interface(s) (206). The interface(s) (206) may comprise a variety of interfaces, for example, interfaces for data input and output devices, referred to as I/O devices, storage devices, and the like. The interface(s) (206) may facilitate communication of the system (110). The interface(s) (206) may also provide a communication pathway for one or more components of the system (110). Examples of such components include, but are not limited to, processing unit/engine(s) (208) and a database (210).

The processing unit/engine(s) (208) may be implemented as a combination of hardware and programming (for example, programmable instructions) to implement one or more functionalities of the processing engine(s) (208). In the examples described herein, such combinations of hardware and programming may be implemented in several different ways. For example, the programming for the processing engine(s) (208) may be processor-executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may include the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry.

The processing engine (208) may include one or more modules/engines selected from any of a receiving module (212), a determining module (214), an assigning module (216), an aggregating module (218), a processing module (220), and other module(s) (222). The processing engine (208) may further be edge-based micro service event processing, but not limited to the like.

In an embodiment, the receiving module (212) may receive, to record to the blockchain network (112), blockchain data comprising different types of information associated with one or more tasks. In an embodiment, the different types of information include, but are not limited to, sensor data/information, petroleum data/information, telecommunication information, information for different groups of users, which are partitioned based on the geographical region such as city, district state, can be processed in different time-spatial partitions. In another example, in the field of healthcare applications such as managing a pandemic, tracking information can be recorded on local time-spatial partitions. The local time-spatial partitions may record data based on demographics such as migrant laborers, or lower/middle/upper-class segments, or frontline healthcare workers, and across different geographical regions such as cities, villages, states, union territories, and so on or based on age to process to analyze the effect of the pandemic across the regions, and to record information such as test results or recovery/failure inpatient process or medical treatment techniques. The time-spatial partitioned data based on the geographical region may be recorded dynamically at edge time-spatial partition and aggregated at a common partition. In an embodiment, pub-sub notifications may be configured to communicate across common time-spatial dimensions e.g., elder demographic or a child demographic at different geographical regions, to transfer information across the time-spatial partitions. In another embodiment, a machine learning (ML) model may be configured for any subset of data that is recorded. In an exemplary embodiment, supply-chain information can be analyzed to determine trends in the fall of availability of medical apparatus or kits, which enables re-distribution of medical apparatus or kits across different time-spatial partitions. For an example, aerial vehicles such as drones may be used to transfer medical apparatus or kits if required. In an embodiment, when there is high demand for medical apparatus or kits at a particular time-spatial partition, demand may be replenished from another nearby time-spatial partition.

In an embodiment, the aggregation processing of information at the hierarchical structure can be performed across TS partitions based on a geographical region such as a state or a country by processing the blockchain data in the TS partitions for different subregions e.g., cities or villages in geographical region. The aggregate processing across time-spatial partitions can be communicated to the TS partition if needed for comparison, or to generate a machine-learned prediction model that performs a weighted combination of local vs aggregated metrics across TS partitions.

In an embodiment, the different types of information may also refer to other blockchain use-cases/verticals as well. In an exemplary embodiment, blockchain data for different supply chains could be recorded in different time-spatial partitions. Additionally, the blockchain data for different segments of the same supply chain may be recorded in different time-spatial partitions, with information transfer through the connections to process data across the time-spatial partitions.

In an embodiment, the one or more tasks may refer to any task that is applicable to the blockchain network (112), which include, but are not limited to, aggregation, fusion, hierarchical machine learning, federated learning microservices, and the like. For instance, the one or more tasks may be store data related to the handover of the user (102) of the first computing device (104) in t=a telecommunication area. Further, the task may include managing a pandemic, tracking information, and the like. In yet another instance, the task may include recording any kind of data in the blockchain network (112).

In an embodiment, the determining module (214) may determine time dimensions and spatial dimensions from the received blockchain data to analyze metrics or usage patterns at different time windows for a pre-defined time. In an embodiment, the assigning module (216) may assign in the blockchain network (112), a hierarchical structure with different levels for one or more time-spatial partitions, based on the determined time dimensions and spatial dimensions. The time-spatial partitions may be assigned based on at least one of a computational, a storage resource, and a network, requirements, and constraints in each of the time-spatial partitions in the blockchain network. The time-spatial partitions within a level in the hierarchical structure may be connected through a first connection and the time-spatial partitions between the levels are connected through a second connection.

Further, the aggregating module (218) may aggregate an arrival data processing rate of the one or more tasks for accomplishing across the assigned one or more time-spatial partitions relative to a single time-spatial partition. Furthermore, the processing module (220) may process data in the hierarchical structure of the blockchain network (112) across one or more time-spatial partitions, when the processing of the aggregated arrival data is to be performed across the one or more time-spatial partitions. In an embodiment, the arrival data processing rate may be aggregated to periodically archive the blockchain data from a Dynamic partition memory (DPM) into an archived partition memory (APM) to free-up space in the DPM. Further, periodic archiving of the blockchain data may be based on the arrival data processing rate of data in the one or more time-spatial partitions, and wherein, when the blockchain data stored in a DPM reaches a threshold, some fraction of the blockchain data from DPM is archived in the APM. In an embodiment, the one or more time-spatial partitions are aggregated into an aggregated set, such that aggregated arrival data processing rate of the one or more time-spatial partitions of the aggregated set is less than or equal to the maximum arrival data processing rate that is supported by a Dynamic partition memory (DPM) and an archived partition memory (APM).

In an embodiment, the assigning module (216) may assign one or more edge time-spatial partitions for processing edge blockchain data comprising mobility data. Each edge time-spatial partitions of the one or more edge time-spatial partitions handoffs processing of the edge blockchain data to a second edge time-spatial partition, when the mobility data comprises a handover. For the processing of the edge blockchain data, the processor (202) may transmit a request for handover trigger, from a first edge time-spatial partition to the time-spatial partition to manage a session during the processing of the edge blockchain data. The time-spatial partition is a common time-spatial partition. Further, the processor (202) may, upon receiving the request, interact via the common time-spatial partition with one or more edge time-spatial partitions, by continuing to process the edge blockchain data, and determine a second edge time-spatial partition, based on the mobility data. Further, the processor (202) may transmit the edge blockchain data from the common time-spatial partition to the determined second edge time-spatial partition. Furthermore, the processor may inform via the common time-spatial partition to the first edge time-spatial partition regarding a successful handover of the mobility data to the second edge time-spatial partition.

In an embodiment, the system (110) may be a System on Chip (SoC) system but not limited to the like. In another embodiment, an onsite data capture, storage, matching, processing, decision-making, and actuation logic may be coded using Micro-Services Architecture (MSA) but not limited to it. A plurality of microservices may be containerized and may be event based to support portability.

In an embodiment, the network architecture (100) may be modular and flexible to accommodate any kind of changes in the system (110) as proximate processing may be acquired towards re-estimating of stock. The system (110) configuration details can be modified on the fly.

In an embodiment, the system (110) may be remotely monitored and the data, application, and physical security of the system (110) may be fully ensured. In an embodiment, the data may get collected meticulously and deposited in a cloud-based data lake to be processed to extract actionable insights. Therefore, the aspect of predictive maintenance can be accomplished.

In an exemplary embodiment, the communication network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an Internet, an intranet, a public network, a private network, a packet-switched network, a circuit-switched network, an ad hoc network, an infrastructure network, a Public-Switched Telephone Network (PSTN), a cable network, a cellular network, a satellite network, a fiber-optic network, some combination thereof.

In an embodiment, the one or more first computing devices (104) or the second computing device may communicate with the system (110) via a set of executable instructions residing on any operating system, including but not limited to, Android™, iOS™, Kai OS™, and the like. In an embodiment, the one or more first computing devices (104) may include, but are not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as a touchpad, touch-enabled screen, electronic pen and the like. It may be appreciated that the one or more first computing devices (104) may not be restricted to the mentioned devices and various other devices may be used. A smart computing device may be one of the appropriate systems for storing data and other private/sensitive information.

Figure 3A:
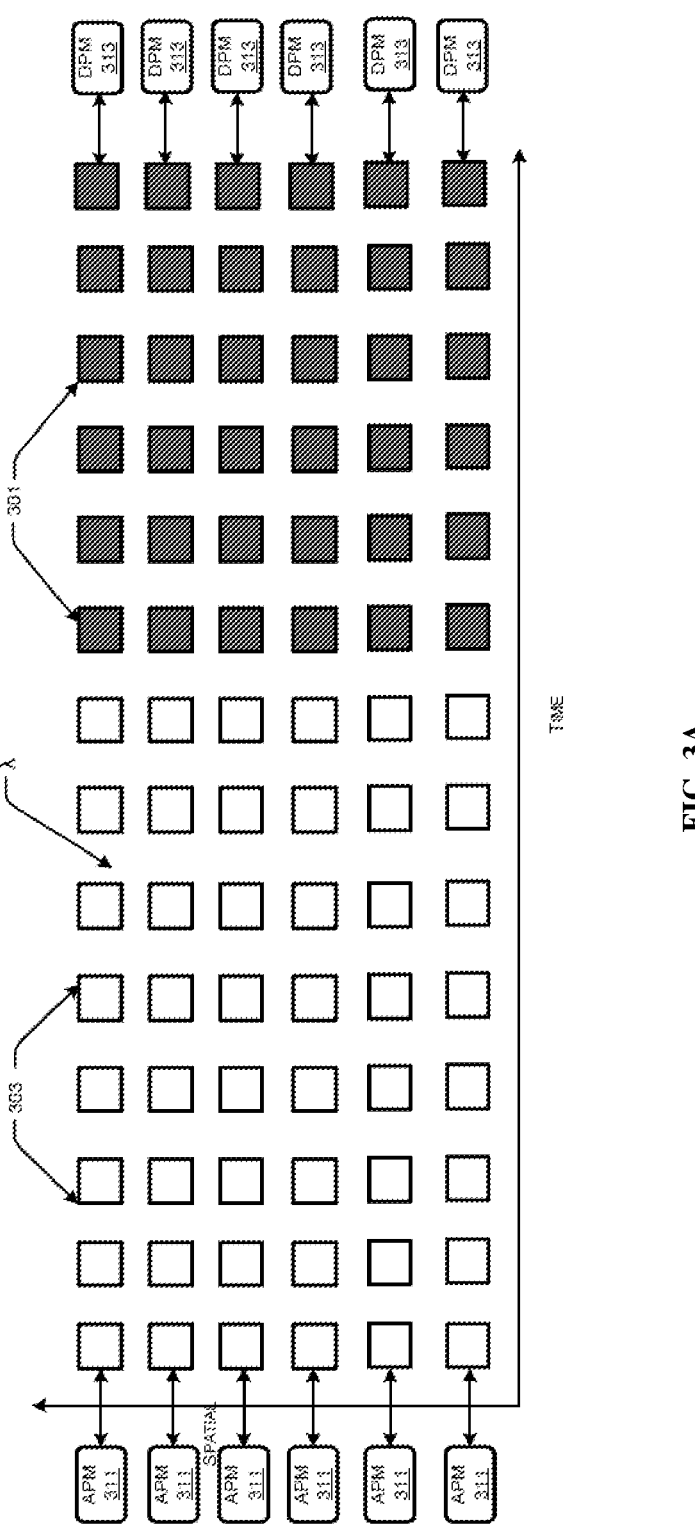
FIG. 3A illustrates an exemplary graphical representation of data processing across time-spatial partitions in the blockchain network, in accordance with an embodiment of the present disclosure.

FIG. 3A illustrates an exemplary graphical representation of data processing across time-spatial partitions in the blockchain network, in accordance with an embodiment of the present disclosure. As shown in FIG. 3A, blocks (301) may represent time-spatial blocks in the active memory of fast-access memory such as Dynamic Partition Memory (DPM) (313) for faster processing. Further, blocks (303) may represent time-spatial blocks in Archived Partition Memory (APM) 311. The blocks (301) may include recent information, whereas the blocks (303) may include older information. In an instance, when the blockchain network (112) records, for example, Internet of things (IoT) sensor data, the spatial dimension may be associated with the geographical region associated with an IoT sensor. In this manner, IoT data streams associated with different geographical regions may be processed and recorded in different time-spatial partitions in the blockchain network (112).

In another instance, when the blockchain network (112) records information related to mobile user data, then the spatial dimensions can be associated with any one or a combination of, but are not limited to, alphabetical name-ranges; demographic values such as age-ranges, or income-ranges; statically determined geo-spatial home/work location regions; or gender, and the like. In addition, a current context specific to the use-case can also be utilized, such as a current geolocation for dynamic processing. In an example, if 'K' spatial dimensions are used, then this becomes a 'K+1' time-spatial partitioning for the blockchain data being processed in the system (110), then the data can be represented by a 'K+1' tuple, with a '1' tuple-value indicating a time-interval, and the remaining 'K' tuple values indicating spatial intervals.

Embodiments herein may use various methods may be used to archive old data in the blockchain network (112). In an example, the data from the DPM (313) may be periodically moved into the APM (311) to free up space in the DPM (313). The frequency with which the data is archived may be dependent on an arrival rate (hereinafter referred to as arrival data processing rate) of data in the different time-spatial partitions. When the data stored in the DPM (313) reaches a threshold, some fraction of the data from the DPM (313) may be archived in the APM (311) periodically.

Figure 3B:
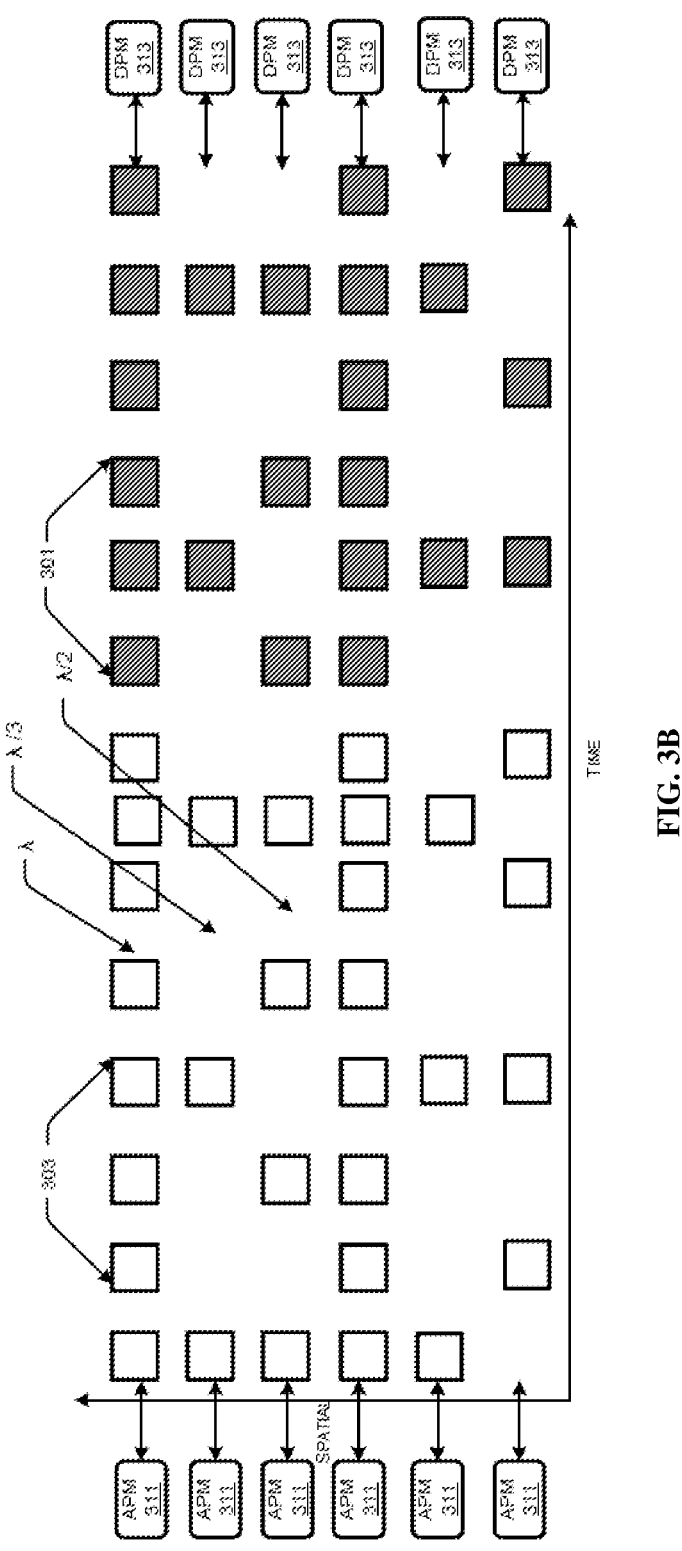
FIG. 3B illustrates an exemplary graphical representation of data processing at variable data processing rate across time-spatial partitions, in accordance with embodiments of the present disclosure.

FIG. 3B illustrates an exemplary graphical representation of data processing at variable data processing rate across time-spatial partitions, in accordance with embodiments of the present disclosure. The rate at which data processing occurs at each time, the spatial partition may vary across partitions. Hence, microservices allocated for data processing at the blockchain network (112) can be scaled up dynamically. As shown in FIG. 3B, there may be two data streams at data processing rate 'λ', two data streams at data processing rate 'λ/2' and two data streams at data processing rate 'λ/3'.

In an embodiment, a degree of improvement in performance for a blockchain use-case is dependent on the number of concurrent time-spatial partitions that can be created, and the expected gains are based on the aggregate arrival rate of task processing that can be accomplished across the partitions relative to a single time-spatial partition based on the available time-spatial dimensions for a specific blockchain use-case. Further, a virtual centralized processing unit (vCPU) such as the system (110) may refer to a centralized processing unit that processes one or more time-spatial partitions. The data processing at variable data rates across time-spatial partitions can be illustrated with the following example.

Exemplary Scenario:

If 'λi' may refer to the rate of arrival of tasks per second for time-spatial partition 'TSi' and each task in partition 'TSi' may utilize vCPU computational resources of 'αi' units, the partition 'TSi' may consume 'αi λi' resources per second. In case, when each vCPU can support resources of 'β' units per second, the allocation of one or more vCPUs can be performed based on a comparison between 'αi λi' and 'β'.

Consider a Case 1: αi λi>β:

In this case, there may be multiple vCPU required for the execution of a single time-spatial partition. Several vCPUs required to process tasks for partition 'TSi' may be 'αi λi/β'. The number of vCPUs required may vary dynamically with each partition 'TSi' based on the dynamic value of 'λi', where, 'λi' varies with time. In this manner, computation processing requirements can be scaled dynamically for each partition 'TSi' independent of other time-spatial partitions.

Figure 3C:
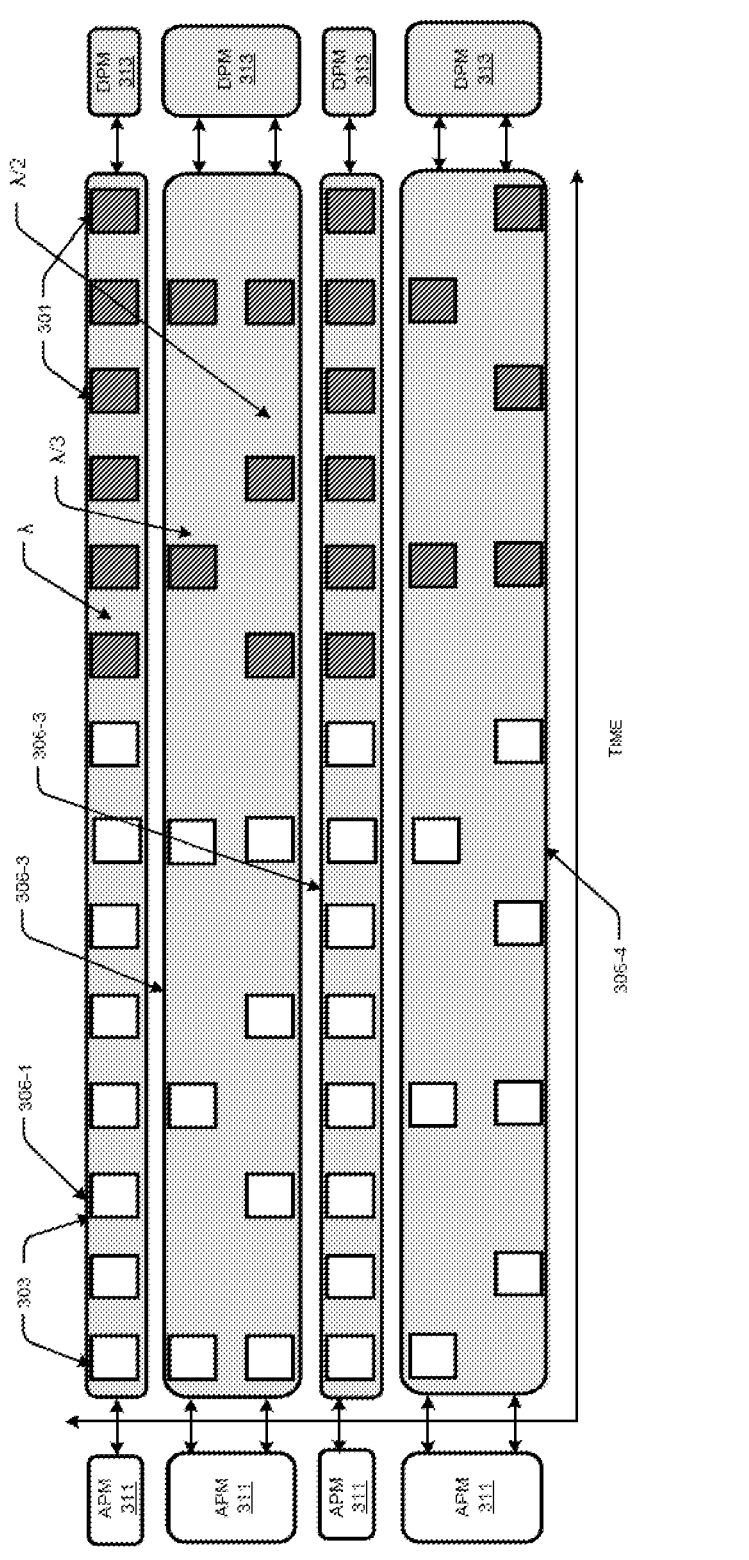
FIG. 3C illustrates an exemplary graphical representation of data processing across time-spatial partitions with aggregation of time-spatial partitions, based on computational requirements, in accordance with an embodiment of the present disclosure.
Figure 3D:
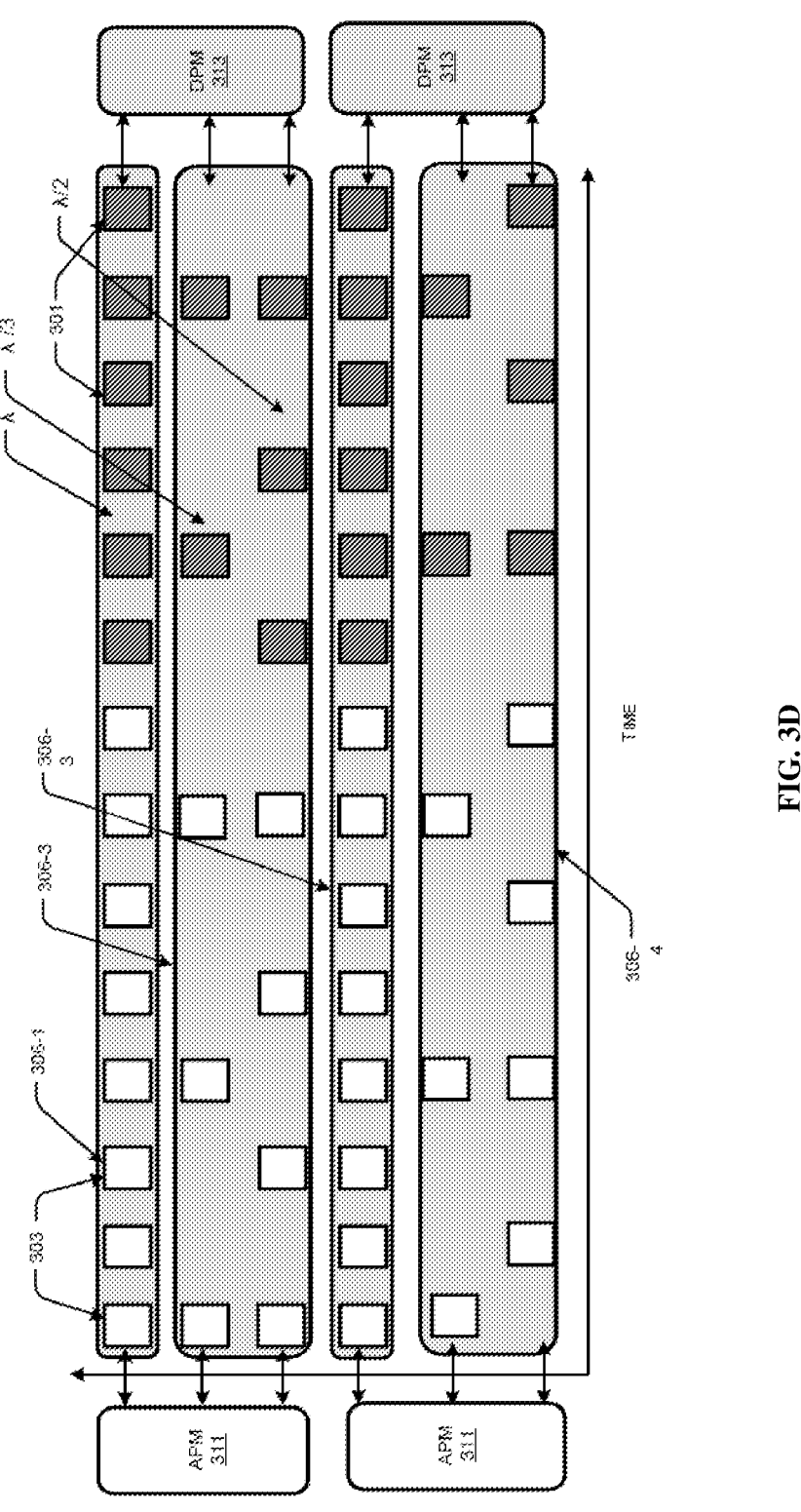
FIG. 3D illustrates an exemplary graphical representation of data processing across time-spatial partitions with aggregation of time-spatial partitions based on storage considerations, in accordance with embodiments of the present disclosure.

Consider a Case 2: αi λi<β:

In this case, multiple time-spatial partitions can be aggregated into an aggregated set 'B' (i∈B) such that the aggregated arrival rate is less than or equal to capacity 'β' of vCPU as illustrated in FIGS. 3C and 3D. In other words, for aggregation an equation 1 is provided below:

$$\Sigma_{i\in B}\lambda i \leq \beta \qquad \text{Equation 1}$$

FIG. 3C illustrates an exemplary graphical representation of data processing across time-spatial partitions with aggregation of time-spatial partitions, based on computational requirements, in accordance with an embodiment of the present disclosure.

In FIG. 3C, blocks (306-1, 306-2, 306-3, and 306-4) (collectively termed as block 306) represent vCPUs that process time-spatial partitions in the blockchain network (112). Each of the blocks (306-1) and (306-3) may process the time-spatial partition associated with the arrival rate 'λ', whereas each of the blocks (306-2) and (306-4) may process the aggregated time-spatial partitions associated with arrival rates 'λ/3' and 'λ/2'. As shown in FIG. 3C, the DPM (313) or the APM (311) may support one or more time-spatial partitions associated with one vCPU-constrained stream such as (306-1), (306-2), (306-3), and (306-4), whereas the FIG. 3D shows DPM (313) or APM (311) that can support one or more TS partitions associated with multiple vCPU-constrained streams such as (306-1) and (306-2), and (306-3) and (306-4).

In an embodiment, time-spatial partitioning may be performed based on computational requirements in each of the time-spatial partitions in the blockchain network. However, the computational constraints may not be aligned with storage processing considerations. For example, consider, if, 'λ$_{DPM}$' and 'λ$_{APM}$' are the maximum arrival rate that can be supported by the DPM (313) and the APM (311), respectively, then the time-spatial partitions can be aggregated into an aggregated set 'A' (i∈A) such that aggregated arrival rate of the time-spatial partitions of the set 'A' is less than or equal to the maximum arrival rate that can be supported by the DPM (313) and the APM (311), which is represented in the equation 2 and 3 below:

$$\Sigma_{i\in B}\lambda i \leq \lambda \text{DPM for DPM aggregation} \qquad \text{Equation 2}$$

$$\Sigma_{i\in B}\lambda i \leq \lambda \text{APM for DPM aggregation} \qquad \text{Equation 3}$$

In an instance, the aggregation cannot be performed across any subset of time-spatial dimensions. Depending on the use-case, the time-spatial partitions may be aggregated based on the computational or storage constraints in the blockchain network.

FIG. 3D illustrates an exemplary graphical representation of data processing across time-spatial partitions with aggregation of time-spatial partitions based on storage considerations, in accordance with embodiments of the present disclosure. As shown in FIG. 3D, a single DPM or APM may support multiple time-spatial partitions that can be combined across aggregate vCPU-constrained streams. FIG. 3D shows a group of time-spatial partitions associated with different arrival rates such as 'λ', 'λ/3', and 'λ/2'. The DPMs or APMs may have the ability to handle a combined arrival rate of tasks that is greater than aggregated arrival rate of the time-spatial partitions, where the aggregated arrival rate would be 'λ+λ/3+λ/2' which may be equal to, for example, '11λ/6'.

In an instance, the time-spatial partition can be performed for Fifth Generation (5G) or Sixth Generation (6G) edge data processing. The time-spatial partitioning can be network-limited as well as can be performed based on network constraints. For example, mobile users can be partitioned dynamically based on the user's current geographic location in the spatial dimension, and this can be termed as a Network-Constrained Time-Spatial (NC TS) partition. Such partitioning may be performed due to latency/bandwidth constraints related to fast edge processing, so that the time-spatial partitioning may be performed across distributed data centers as well. For example, edge blockchain data processing for a Ultra Reliable Low Latency Communications (URLLC) based on use-cases may be heavily constrained by latency such that processing needs to be completed in the order of a few milli-seconds. After partitioning based on network constraints, further partitioning at a data center can be performed based on other time-spatial factors to adapt to compute and storage resource requirements and constraints.

Figure 4A:
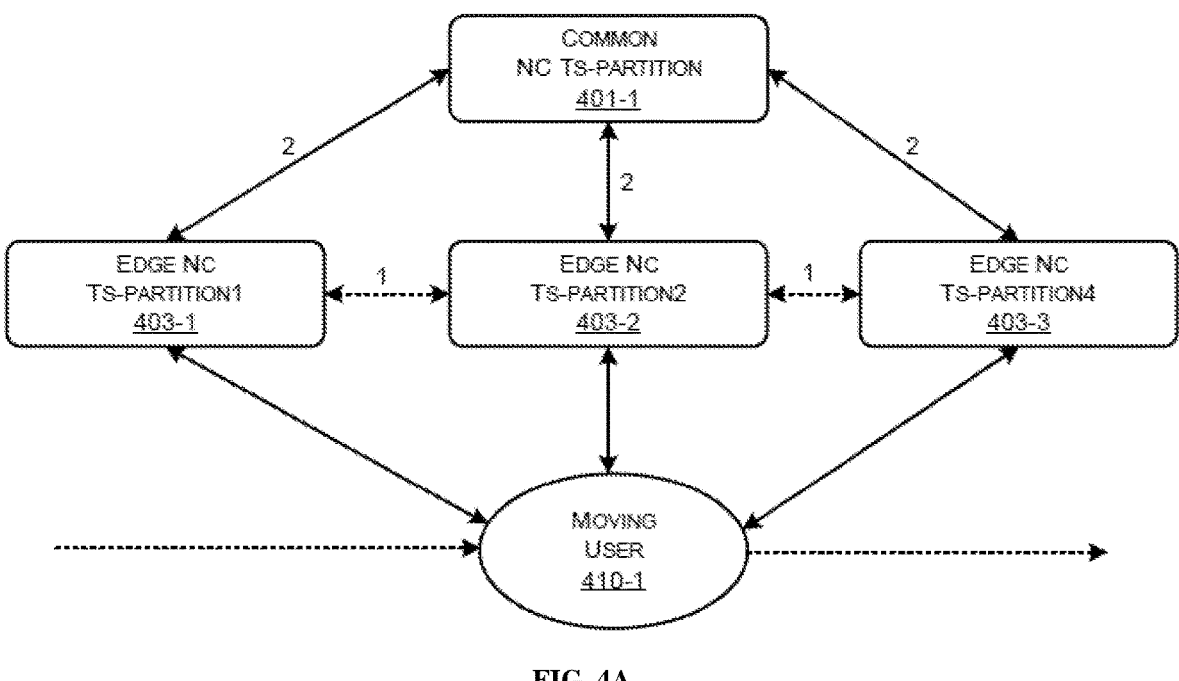
FIG. 4A illustrates an exemplary flow diagram representation of a hierarchical structure across time-spatial partitions with two levels of hierarchy in the blockchain network, in accordance with embodiments of the present disclosure.

FIG. 4A illustrates an exemplary flow diagram representation of a hierarchical structure across time-spatial partitions with two levels of hierarchy in the blockchain network, in accordance with embodiments of the present disclosure. In an instance, processing between time-spatial partitions may be performed based on the hierarchical structure among the time-spatial partitions in the blockchain network (112). The blockchain data associated with a user may be recorded in a time-spatial partition at a lower level that is serving the user (102). As shown in FIG. 4A, when the mobility of a moving user (410-1) has to be managed for a highly mobile user across serving regions in 5G networks, then data processing for such a user could be performed at a higher level common Network Constrained (NC) Time-Spatial (TS) partition (401-1) that supports multiple lower-level Network Constrained (NC) Time-Spatial (TS) partitions (403-1), (403-2), and (403-3) (collectively termed as NC TS partitions (403) and individually termed as NC TS partition (403)) in the hierarchical structure.

For instance, the information related to processing in the blockchain network (112) may include information related to User Plane Functions (UPF) and Control Plane Functions (CPF) of the 5G network. The user information related to active UPF associated with the user, may be recorded on the blockchain network (112)/DLT platform for blockchain or Distributed Ledger Technology (DLT) transactions associated with the user. Additionally, or alternatively, information related to processing with different CPFs such as, but are not limited to, the Access And Mobility Function (AMF), or the Session Management Function (SMF), Authentication Server Function (ASF), or Unified Data Management Function (UDMF), or user information stored in the user data repository, or network slice allocation information can also be recorded on the blockchain/DLT platform in the edge TS partitions, and the like.

In an exemplary embodiment, each edge NC TS partition (403) can support a different nearby geographical region. Each of the TS partitions may be connected through a connection. In an example, TS partitions within a level in hierarchical structure may be connected through a first connection (shown as connection 1 in FIG. 4A), whereas TS partitions between the levels may be connected through second connections (shown as connection 2 in FIG. 4A).

In an instance, the blockchain data associated with the mobility of the moving user (410-1) may be recorded based on the degree of the mobility of the user. In an example, where the user may be highly mobile, the blockchain data may be recorded across edge NC TS Partitions (403-1), (403-2), and (403-3). Alternatively, if a user is static or quasi-static, then the corresponding blockchain data could be recorded on the edge NC TS Partition (403-2), which may be closest to the moving user (410-1) as shown in FIG. 4A.

In another instance, the common NC TS partition (401-1) can perform blockchain data processing for user data, and also record data associated with network functions and user mobility information only when the user is near to multiple possible serving regions, and when it may experience a handover at this time. Subsequently, after handover, the data associated with the user could be managed by the nearest edge NC TS partition (403). In addition, the edge NC TS partition can periodically update the common NC TS partition so that the common NC TS partition may be ready to handle user mobility and handover when it happens again at a future time. In another instance, if user mobility has to be managed for a highly mobile user across different AMF serving regions in 5G networks, then data processing for such a user may be performed in a specific network-constrained (NC) TS partition at the network edge without the need for a common NC TS partition. For example, a first edge NC TS partition can handoff processing of the user data to a second edge NC TS partition when the user experiences a handover from the first AMF serving region to a second AMF serving region. In such a case, the first edge NC TS partition may keep the second edge NC TS partition updated to store the user information at the second edge NC TS partition to enable further processing for the UE after the handover.

Figure 4B:
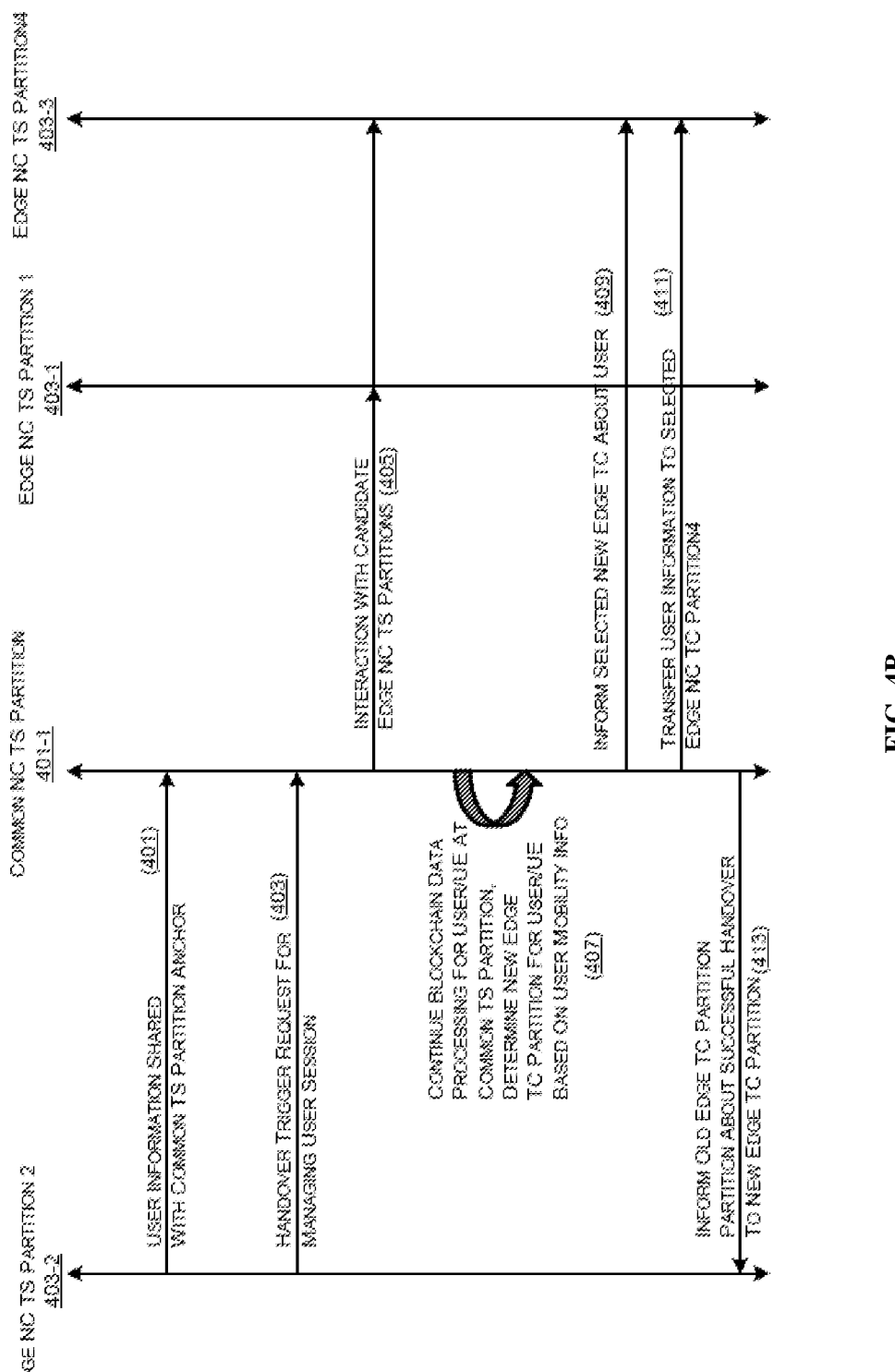
FIG. 4B illustrates an exemplary sequence diagram representation of communication among Network Constrained (NC) time-spatial (TS) partitions in the blockchain network, in accordance with embodiments of the present disclosure.

FIG. 4B illustrates an exemplary sequence diagram representation of communication among Network Constrained (NC) time-spatial (TS) partitions in the blockchain network, in accordance with embodiments of the present disclosure.

At step (401), the edge time partition (403-2) may share the user information with a common time-spatial partition (401-1). At step (403), the edge time-spatial partition (403-2) may transmit a request for handover trigger to the common time-spatial partition (401-1) to manage user sessions. At step (405), upon receiving the request, the common time-spatial partition (401-1) may interact with another edge TS partitions (403-1) and (403-3). At step (407), the common time-spatial partition (401-1) may continue the blockchain data for the user and determine a new edge time-spatial partition for the user based on the mobility information of the user. At step (409), based on the determination or selection of the new edge time-spatial partition (403-3), the common time-spatial partition (401-1) may inform the selected edge time-spatial partition (403-3) about the user. At step (411), the common time-spatial partition (401-1) may transmit user information to the selected edge time-spatial partition (403-3) regarding the user. At step (413), the common time-spatial partition (401-1) may inform the old edge time-spatial partition (403-2) about the successful handover of the user to the new edge TS partition (403-3).

Figure 4C:
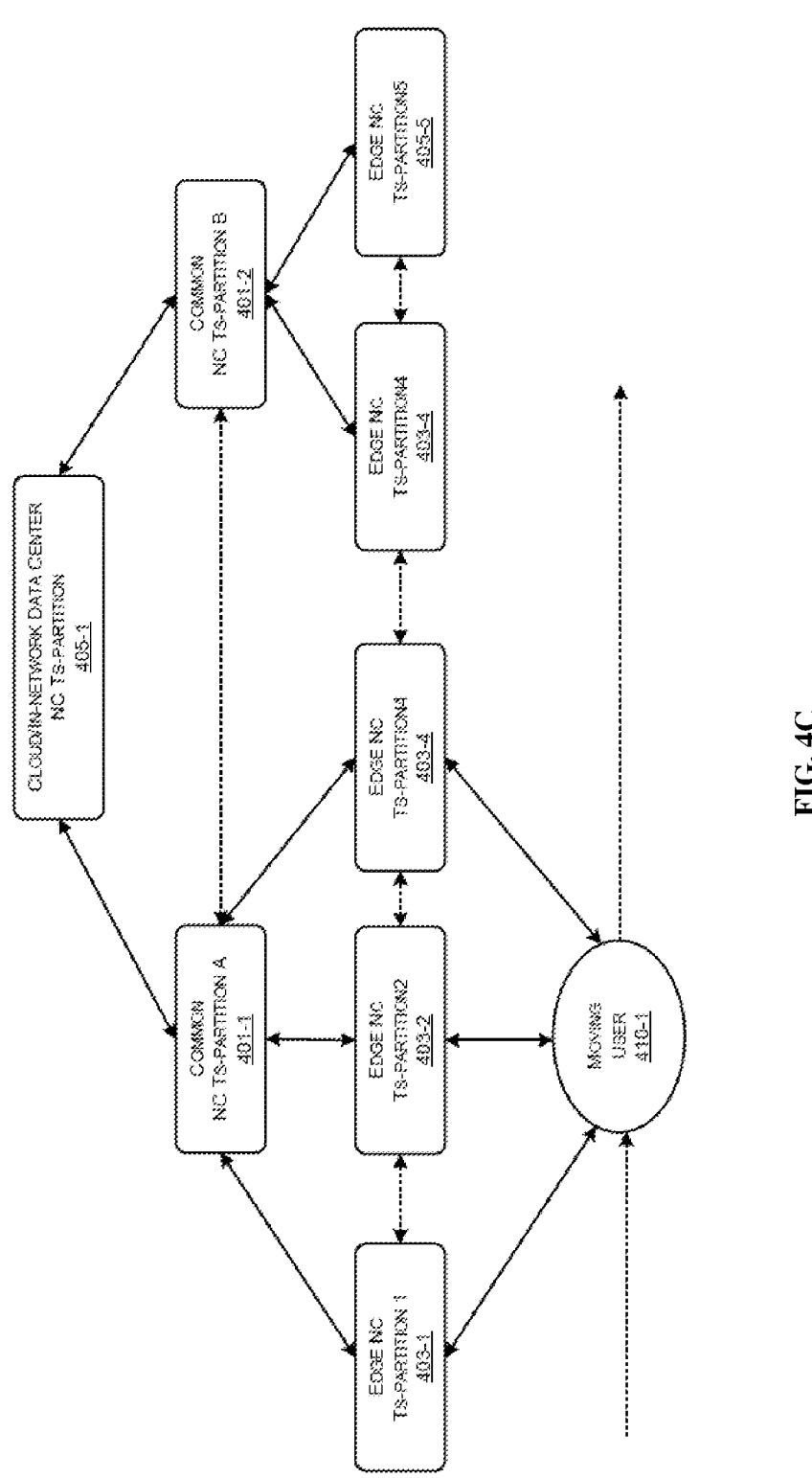
FIG. 4C illustrates an exemplary flow diagram representation of a hierarchical structure across time-spatial partitions with three levels of hierarchy in the blockchain network, in accordance with embodiments of the present disclosure.
Figure 4D:
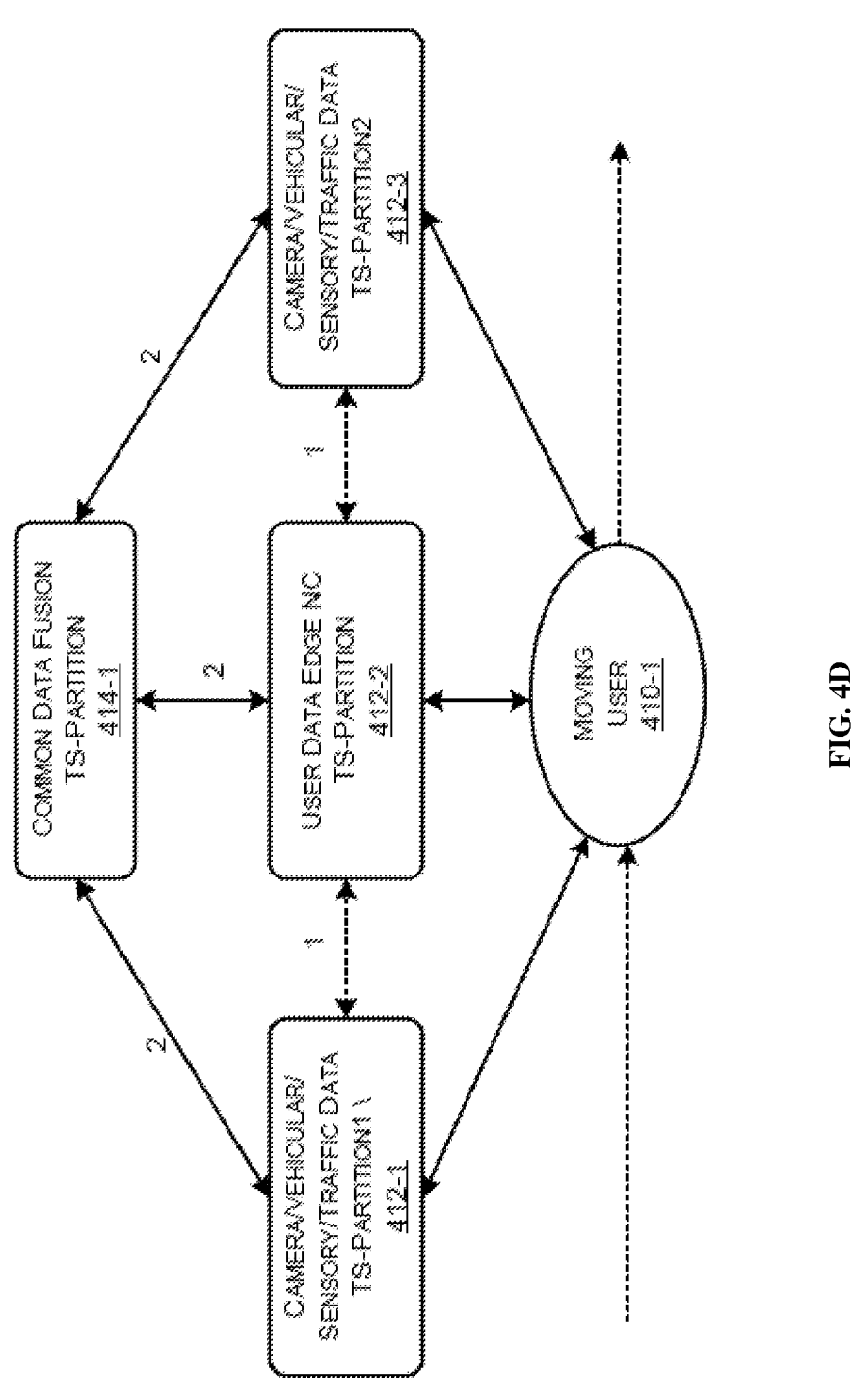
FIG. 4D illustrates an exemplary flow diagram representation of a hierarchical structure across time-spatial partitions provided with aggregated processing in the blockchain network, in accordance with embodiments of the present disclosure.

FIG. 4C illustrates an exemplary flow diagram representation of a hierarchical structure across time-spatial partitions with three levels of hierarchy in the blockchain network, in accordance with embodiments of the present disclosure. As shown in FIG. 4C, the hierarchical processing can be extended to multiple common NC TS partitions (401-1) and (401-2), so that a cloud/in-network data center NC TS partition (405-1) may perform processing of information across multiple common NC TS partitions (401-1) and (401-2), where the common TS partition (403-1) may process the data across edge NC TS partitions (403-1), (403-2), and (403-3), whereas the common TS partition (403-2) may process the data across TS partitions (403-4) and (403-5). FIG. 4D illustrates an exemplary flow diagram representation of a hierarchical structure across time-spatial partitions provided with aggregated processing in the blockchain network, in accordance with embodiments of the present disclosure. The processing in the hierarchical structure of the blockchain network (112), can be performed across multiple time-spatial dimensions, if some aggregated processing requires it to happen across partitions. In an instance, at least one of, but are not limited to, aggregation, fusion, hierarchical machine learning, federated learning microservices, and the like, can be configured to process trusted blockchain data across different time-spatial partitions. In an example, if data associated with IoT camera or vehicular motion/traffic or sensory or pollution in a given geographical region, is being processed in one time-spatial partition (412-1), and if the same data needs to be merged with mobility data of the user in another geographical region configured in another user data edge NC TS partition (412-2), then the data across these data streams can be processed hierarchically at a common TS partition (414-1) that combines the data received from these two TS partitions (412-1) and (412-2). Additional TS partition data streams (412-3) can also be fused at the same level in the hierarchy.

In an instance, the outcome of the processing can be recorded in the common TS partition (414-1) across the data streams, and also in the lower-level TS partition associated with the user. In an alternate embodiment, the data processing may be performed at the common TS partition (414-1), and the recording of the outcome of processing can be done in a blockchain ledger TS partition for the user to record any outcome made on behalf of the user based on the processed data. For example, information may be directly forwarded to the user data edge NC TS partition that may be currently supporting the user, and the data fusion can be performed directly at the user data edge NC TS partition, and the outcome is recorded in a blockchain ledger in the latter partition. The connections 1 shown in FIG. 4D may allow for federated learning and edge processing, whereas connections 2 shown in FIG. 4D may allow building learning models across edge networks. Thus, any predictions and user recommendations can be processed either at the edge TS partition or common TS partition as well. Hence, processing at the hierarchical structure is also performed across TS partitions that correspond to different time-spatial dimensions for a user. Further, aggregate processing across the time dimension can be performed for different time dimensions along with other spatial dimensions such as to determine metrics or usage patterns at different time-windows in a day.

Embodiments herein may be applicable to other blockchain use-cases/verticals as well. In an instance, blockchain data for different supply chains could be recorded in different TS partitions. Alternatively, or additionally, the blockchain data for different segments of the same supply chain may be recorded in different TS partitions, with information transfer through the connections to process data across the TS partitions. In an example, in the field of petroleum or telecommunication, information for different groups of users, which are partitioned based on the geographical region such as city, district state, can be processed in different TS partitions. In another example, in the field of healthcare applications such as managing a pandemic, tracking information can be recorded on local TS partitions. The local TS partitions may record data based on demographics such as migrant laborers, or lower/middle/upper-class segments, or frontline healthcare workers, and across different geographical regions such as cities, villages, states, union territories, and so on or based on age to process to analyze the effect of the pandemic across the regions, and to record information such as test results or recovery/failure inpatient process or medical treatment techniques. The TS partitioned data based on the geographical region may be recorded dynamically at edge TS partition and aggregated at a common cloud or in-network data center.

In an embodiment, pub-sub notifications may be configured to communicate across common time-spatial dimensions e.g., elder demographic or a child demographic at different geographical regions, to transfer information across the TS partitions. In another embodiment, a Machine Learning (ML) model may be configured for any subset of data that is recorded. In an exemplary embodiment, the supply-chain information can be analyzed to determine trends in the fall of availability of medical apparatus or kits, which enables re-distribution of medical apparatus or kits across different TS partitions. For example, aerial vehicles such as drones may be used to transfer medical apparatus or kits if required. In an embodiment, when there is high demand for medical apparatus or kits at a particular TS partition, demand may be replenished from another nearby TS partition. In an embodiment, the aggregation processing of information at the hierarchical structure can be performed across TS partitions based on a geographical region such as a state or a country by processing the blockchain data in the TS partitions for different subregions e.g., cities or villages in geographical region. The aggregate processing across TS partitions can be communicated to the TS partition if needed for comparison, or to generate a machine-learned prediction model that performs a weighted combination of local vs aggregated metrics across TS partitions.

FIG. 5 illustrates an exemplary method flow chart depicting a method for time-spatial data partitioning in a blockchain network, in accordance with an embodiment of the present disclosure.

As illustrated in FIG. 5, the method (500) includes one or more blocks illustrating a method of d time-spatial data partitioning in a blockchain network. The method (500) may be described in the general context of computer-executable instructions. Generally, computer-executable instructions can include routines, programs, objects, components, data structures, procedures, modules, and functions, which perform functions or implement abstract data types.

The order in which the method (500) is described is not intended to be construed as a limitation, and any number of the described method blocks can be combined in any order to implement the method (500). Additionally, individual blocks may be deleted from the methods without departing from the scope of the subject matter described herein. Furthermore, the method (500) can be implemented in any suitable hardware, software, firmware, or combination thereof.

At block (502), the method (500) may include receiving, by a processor (202) associated with a system (110), to record to a blockchain network (112), blockchain data comprising different types of information associated with one or more tasks.

At block (504), the method (500) may include determining, by the processor (202), time dimensions and spatial dimensions from the received blockchain data to analyze metrics or usage patterns at different time windows for a pre-defined time.

At block (506), the method (500) may include assigning, by the processor (202), in the blockchain network (112), a hierarchical structure with different levels for one or more time-spatial partitions, based on the determined time dimensions and spatial dimensions.

At block (508), the method (500) may include aggregating, by the processor (202), an arrival data processing rate of the one or more tasks for accomplishing across the assigned one or more time-spatial partitions relative to a single time-spatial partition.

At block (510), the method (500) may include processing, by the processor (202), data in the hierarchical structure of the blockchain network (112) across one or more time-spatial partitions, when the processing of the aggregated arrival data is to be performed across the one or more time-spatial partitions.

Figure 6:
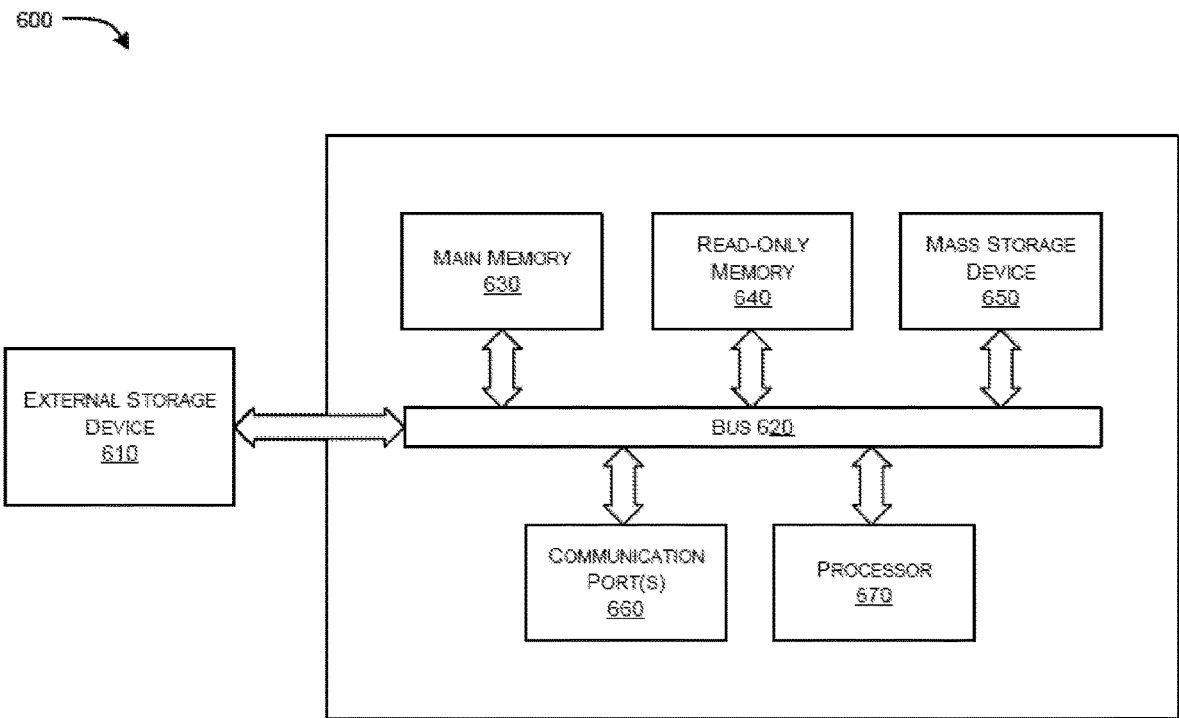
FIG. 6 illustrates an exemplary computer system in which or with which embodiments of the present invention can be utilized, in accordance with embodiments of the present disclosure.

FIG. 6 illustrates an exemplary computer system (600) in which or with which embodiments of the present invention can be utilized, in accordance with embodiments of the present disclosure.

As shown in FIG. 6, computer system (600) can include an external storage device (610), a bus (620), a main memory (630), a read-only memory (640), a mass storage device (650), communication port (660), and a processor (670). A person skilled in the art will appreciate that the computer system may include more than one processor and communication ports. Examples of processor (670) include, but are not limited to, an Intel® Itanium® or Itanium 2 processor(s), or AMD® Opteron® or Athlon MP® processor(s), Motorola® lines of processors, FortiSOC™ system on chip processors or other future processors. Processor (670) may include various modules associated with embodiments of the present invention. Communication port (660) can be any of an RS-232 port for use with a modem-based dialup connection, a 10/100 Ethernet port, a Gigabit or 10 Gigabit port using copper or fiber, a serial port, a parallel port, or other existing or future ports. Communication port (660) may be chosen depending on a network, such as a Local Area Network (LAN), Wide Area Network (WAN), or any network to which the computer system connects. Memory (630) can be Random Access Memory (RAM), or any other dynamic storage device commonly known in the art. Read-only memory (640) can be any static storage device(s) e.g., but not limited to, a Programmable Read-Only Memory (PROM) chips for storing static information e.g., start-up or BIOS instructions for the processor (670). Mass storage (650) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 13K800), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus (620) communicatively couples' processor(s) (670) with the other memory, storage, and communication blocks. Bus (620) can be, e.g., a Peripheral Component Interconnect (PCI)/PCI Extended (PCI-X) bus, Small Computer System Interface (SCSI), USB or the like, for connecting expansion cards, drives, and other subsystems as well as other buses, such a front side bus (FSB), which connects processor (670) to a software system.

Optionally, operator and administrative interfaces, e.g., a display, keyboard, and a cursor control device, may also be coupled to the bus (620) to support direct operator interaction with a computer system. Other operator and administrative interfaces can be provided through network connections connected through a communication port (660). The external storage device (610) can be any kind of external hard-drives, floppy drives, IOMEGA® Zip Drives, Compact Disc—Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

Various embodiments of the present disclosure provide a system and a method time-spatial data partitioning in the blockchain network. The present disclosure facilitates optimization of blockchain data processing across both time and spatial dimensions, thereby facilitating faster processing and concurrent processing across time-spatial partitions in the blockchain network. In particular, the processing of the data in the blockchain network based on time-spatial partitioning allows blockchain nodes to have access to information across time-spatial partitions. The performance gain through the proposed system and method can be expected based on the number of time-spatial partitions and the aggregate arrival rate of concurrent task processing across the time-spatial partitions compared to arrival rate the processing for a single time-spatial partition.

Embodiments of the present disclosure may be implemented in a distributed ledger network such as a blockchain network in which transactions may be performed between different nodes of the network, where the node may also refer to the entity. The blockchain network implemented as a peer-to-peer network, may enable entities to perform secure and immutable transactions. The time-spatial partitioning allows the blockchain nodes to have access to information across time-spatial partitions. In an embodiment, the time-spatial partitions are formed in the virtualized stateless microservices-based blockchain network, such that the blockchain nodes can continue to have access to data across time-spatial partitions based on configured access-control permissions in the system.

The proposed system and method based on the time-spatial partitioning improves blockchain processing for each specific use-case whenever possible when such time-spatial dimensions can be identified for a use-case, and can be leveraged across different blockchain use-cases as well. The time-spatial dimensions for time-spatial partitioning may vary depending on the use-case considered for data processing in the blockchain network.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as a limitation.

I claim:

1. A system for time-spatial data partitioning in a blockchain network, the system comprising:

a processor;

a memory coupled to the processor, wherein the memory comprises processor-executable instructions, which on execution causes the processor to:

receive, to record to a blockchain network, blockchain data comprising different types of information associated with one or more tasks, wherein the blockchain network is maintained by a plurality of network nodes distributed in a network and operatively coupled to one or more computing devices;

determine time dimensions and spatial dimensions from the received blockchain data to analyze metrics or usage patterns at different time windows for a pre-defined time;

assign in the blockchain network, a hierarchical structure with different levels for one or more time-spatial partitions, based on the determined time dimensions and spatial dimensions;

aggregate an arrival data processing rate of the one or more tasks for accomplishing across the assigned one or more time-spatial partitions relative to a single time-spatial partition; and process data in the hierarchical structure of the blockchain network across one or more time-spatial partitions, when the processing of the aggregated arrival data is to be performed across the one or more time-spatial partitions.

2. The system as claimed in claim 1, wherein the processor is further configured to assign one or more edge time-spatial partitions for processing of edge blockchain data comprising mobility data, wherein, each edge time-spatial partitions of the one or more edge time-spatial partitions handoffs processing of the edge blockchain data to a second edge time-spatial partition, when the mobility data comprises a handover.

3. The system as claimed in claim 2, wherein, for processing of the edge blockchain data, the processor is further configured to:

transmit a request for handover trigger, from a first edge time-spatial partition to a time-spatial partition to manage a session during the processing of the edge blockchain data, wherein the time-spatial partition is a common time-spatial partition;

upon receiving the request, interact via the common time-spatial partition with one or more edge time-spatial partitions, by continuing to process the edge blockchain data, and determine a second edge time-spatial partition, based on the mobility data;

transmit the edge blockchain data from the common time-spatial partition to the determined second edge time-spatial partition; and inform via the common time-spatial partition to the first edge time-spatial partition regarding a successful handover of the mobility data to the second edge time-spatial partition.

4. The system as claimed in claim 1, wherein the time-spatial partitions are assigned based on at least one of a computational, a storage resource, and a network, requirements, and constraints in each of the time-spatial partitions in the blockchain network.

5. The system as claimed in claim 1, wherein the time-spatial partitions within a level in the hierarchical structure are connected through a first connection and the time-spatial partitions between the levels are connected through a second connection.

6. The system as claimed in claim 1, wherein the arrival data processing rate is aggregated to periodically archive the blockchain data from a Dynamic partition memory (DPM) into an archived partition memory (APM) to free-up space in the DPM.

7. The system as claimed in claim 6, wherein periodic archiving of the blockchain data is based on the arrival data processing rate of data in the one or more time-spatial partitions, and wherein, when the blockchain data is stored in a DPM reaches a threshold, some fraction of the blockchain data from DPM is archived in the APM.

8. The system as claimed in claim 1, wherein the one or more time-spatial partitions are aggregated into an aggregated set, such that aggregated arrival data processing rate of the one or more time-spatial partitions of the aggregated set is less than or equal to the maximum arrival data processing rate that is supported by a Dynamic partition memory (DPM) and an archived partition memory (APM).

9. A method for time-spatial data partitioning in a blockchain network, the method comprising:

receiving, by a processor associated with a system, to record to a blockchain network, blockchain data comprising different types of information associated with one or more tasks, wherein the blockchain network is maintained by a plurality of network nodes distributed in a network and operatively coupled to one or more computing devices;

determining, by the processor, time dimensions and spatial dimensions from the received blockchain data to analyze metrics or usage patterns at different time windows for a pre-defined time;

assigning, by the processor, in the blockchain network, a hierarchical structure with different levels for one or more time-spatial partitions, based on the determined time dimensions and spatial dimensions;

aggregating, by the processor, an arrival data processing rate of the one or more tasks for accomplishing across the assigned one or more time-spatial partitions relative to a single time-spatial partition; and processing, by the processor, data in the hierarchical structure of the blockchain network across one or more time-spatial partitions, when the processing of the aggregated arrival data is to be performed across the one or more time-spatial partitions.

10. The method as claimed in claim 9 further comprises assigning, by the processor, one or more edge time-spatial partitions for processing of edge blockchain data comprising mobility data, wherein, each edge time-spatial partitions of the one or more edge time-spatial partitions handoffs processing of the edge blockchain data to a second edge time-spatial partition, when the mobility data comprises a handover.

11. The system as claimed in claim 10, wherein the processing of the edge blockchain data further comprises:

transmitting, by the processor, a request for handover trigger, from a first edge time-spatial partition to a time-spatial partition to manage a session during the processing of the edge blockchain data, wherein the time-spatial partition is a common time-spatial partition;

upon receiving the request, interacting, by the processor, via the common time-spatial partition with one or more edge time-spatial partitions, by continuing to process the edge blockchain data, and determine a second edge time-spatial partition, based on the mobility data;

transmitting, by the processor, the edge blockchain data from the common time-spatial partition to the determined second edge time-spatial partition; and informing, by the processor, via the common time-spatial partition to the first edge time-spatial partition regarding a successful handover of the mobility data to the second edge time-spatial partition.

12. The method as claimed in claim 9, wherein the time-spatial partitions are assigned based on at least one of a computational, a storage resource, and a network, requirements, and constraints in each of the time-spatial partitions in the blockchain network.

13. The method as claimed in claim 9, wherein the time-spatial partitions within a level in the hierarchical structure are connected through a first connection and the time-spatial partitions between the levels are connected through a second connection.

14. The method as claimed in claim 9, wherein the arrival data processing rate is aggregated to periodically archive the blockchain data from a Dynamic partition memory (DPM) into an archived partition memory (APM) to free-up space in the DPM.

15. The method as claimed in claim 14, wherein periodic archiving of the blockchain data is based on the arrival data processing rate of data in the one or more time-spatial partitions, and wherein, when the blockchain data stored in a DPM reaches a threshold, some fraction of the blockchain data from DPM is archived in the APM.

16. The method as claimed in claim 9, wherein the one or more time-spatial partitions are aggregated into an aggregated set, such that aggregated arrival data processing rate of the one or more time-spatial partitions of the aggregated set is less than or equal to the maximum arrival data processing rate that is supported by a Dynamic partition memory (DPM) and an archived partition memory (APM).

* * * * *